US009776489B2

(12) United States Patent
Konishi et al.

(10) Patent No.: US 9,776,489 B2
(45) Date of Patent: Oct. 3, 2017

(54) VEHICLE DEFLECTOR DEVICE

(71) Applicant: AISIN SEIKI KABUSHISIKI KAISHA, Kariya-shi, Aichi-ken (JP)

(72) Inventors: Katsumi Konishi, Toyota (JP); Kazuki Sawada, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/307,067

(22) PCT Filed: Jun. 22, 2015

(86) PCT No.: PCT/JP2015/067926
§ 371 (c)(1),
(2) Date: Oct. 27, 2016

(87) PCT Pub. No.: WO2015/199042
PCT Pub. Date: Dec. 30, 2015

(65) Prior Publication Data
US 2017/0100995 A1      Apr. 13, 2017

(30) Foreign Application Priority Data

Jun. 27, 2014   (JP) ................................ 2014-133199

(51) Int. Cl.
*B60J 7/22*      (2006.01)
*B60J 7/053*     (2006.01)

(52) U.S. Cl.
CPC . *B60J 7/22* (2013.01); *B60J 7/053* (2013.01)

(58) Field of Classification Search
USPC ......................................................... 296/217
See application file for complete search history.

(56) References Cited

U.S. PATENT DOCUMENTS 4,175,785 A * 11/1979 Leiter ...................... B60J 7/003
296/214
2013/0187414 A1    7/2013 Nowack et al.

FOREIGN PATENT DOCUMENTS

CN         203172404        9/2013
JP         11-165538        6/1999

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A deflector apparatus for a vehicle includes a deflector, a support member and a torsion spring. The deflector includes arm portions provided as a pair, and each of the arm portions includes a shaft portion and a cam protruding portion. The support member includes a support recessed portion in which the shaft portion is inserted, a cam recessed portion in which the cam protruding portion is inserted and a support protruding portion. The torsion spring includes a turning portion attached to the support protruding portion, and a first leg portion and a second leg portion each extended in the vehicle front and rear direction from the turning portion. The first leg portion includes a distal end portion which can be in slide contact with the arm portion and the second leg portion includes a distal end portion which can be in slide contact with the support member.

5 Claims, 6 Drawing Sheets

Vehicle inner side ←——→ Vehicle outer side

Vehicle inner side ←→ Vehicle outer side

Vehicle inner side ←→ Vehicle outer side

Vehicle inner side ←→ Vehicle outer side

VEHICLE DEFLECTOR DEVICE

CROSS-REFERENCE TO RELATED APPLICATIONS

This application is a national phase application of International Application No. PCT/JP2015/067926, filed Jun. 22, 2015, and claims the priority of Japanese Application No. 2014-133199, filed Jun. 27, 2014, the content of both of which is incorporated herein by reference.

TECHNICAL FIELD

The present invention relates to a deflector apparatus for a vehicle.

BACKGROUND ART

As a conventional deflector apparatus for a vehicle, for example, a deflector apparatus for a vehicle that is described in Patent document 1 is known. The deflector apparatus for the vehicle includes a deflector and two support bodies. The deflector includes a windbreak portion (a flow rectifying portion) and arm portions provided as a pair. The windbreak portion is arranged along a front edge portion of an opening formed at a roof of a vehicle. The arm portions are extended from respective end portions of the windbreak portion, the end portions in a vehicle width direction, towards a vehicle rear side. The support bodies are fixed to the roof and support rear portions of the arm portions, respectively. Shaft portions (lateral shafts) protrudingly provided at the rear portions of the respective arm portions are inserted in elongated holes (support portions) formed at the respective support bodies so as to be rotatable and so as to be movable in a front and rear direction. Pins (engagement portions) protrudingly provided at the rear portions of the respective arm portions are movably inserted in circular arc-shaped grooves (cam portions) formed at the respective support bodies. Thus, the deflector is guided by the support bodies so as to perform a tilt-up movement (an upward movement of a front) while moving towards a vehicle front side. The opening of the roof is opened and closed by a movable panel. The deflector is biased by two biasing members each formed in a plate spring so that the deflector performs the tilt-up movement in association with an opening operation of the movable panel.

DOCUMENT OF PRIOR ART

Patent Document

Patent document 1: JPH11-165538

SUMMARY OF INVENTION

Problem to be Solved by Invention

At the deflector apparatus for the vehicle of Patent document 1, one end portion (a front portion) of each biasing member is a fixed end fixed to the arm portion and the other end portion (a rear portion) of each biasing member is a free end that is in contact with the support body. Accordingly, when each biasing member is assembled on the deflector apparatus for the vehicle, the fixed end needs to be fixed to the arm portion more firmly, for example. In association with this, assembling workload increases.

A purpose of the present invention is to provide a deflector apparatus for a vehicle, which can restrict assembling workload from increasing.

Means for Solving Problem

A deflector apparatus for a vehicle which solves the above-described problem includes a deflector including a windbreak portion arranged along a front edge portion of an opening provided at a roof of a vehicle, the deflector including arm portions provided as a pair to extend from both end portions, in a vehicle width direction, of the windbreak portion towards a vehicle rear side, each of the arm portions including a shaft portion provided to extend in the vehicle width direction and a cam protruding portion provided to extend in the vehicle width direction, a support member fixed to the roof, the support member including a support recessed portion in which the shaft portion is inserted to be rotatable and to be movable in a vehicle front and rear direction, and a cam recessed portion in which the cam protruding portion is inserted to be movable, the support member including a support protruding portion extended in the vehicle width direction, the support recessed portion guiding movement of the shaft portion and the cam recessed portion guiding movement of the cam protruding portion such that a tilt-up movement of the deflector is performed in association with rotation of the deflector about the shaft portion, and a torsion spring including a turning portion attached to the support protruding portion, the torsion spring including a first leg portion and a second leg portion each extended in the vehicle front and rear direction from the turning portion, the first leg portion including a distal end portion which can be in slide contact with the arm portion, the second leg portion including a distal end portion which can be in slide contact with the support member, the torsion spring biasing the arm portion such that the tilt-up movement of the deflector is performed in association with an opening movement of a movable panel opening and closing the opening.

MODE FOR CARRYING OUT THE INVENTION

An embodiment of a deflector apparatus for a vehicle will be described below. In the following description, a front and rear direction of a vehicle is referred to simply as "front and rear direction", and an upper direction and a lower direction in a vehicle height direction are referred to simply as "upper direction" and "lower direction", respectively. In addition, in a vehicle width direction, a side towards an inner side of a vehicle cabin is referred to as "vehicle inner side" and a side towards an outer side of the vehicle cabin is referred to as "vehicle outer side".

Figure 1:
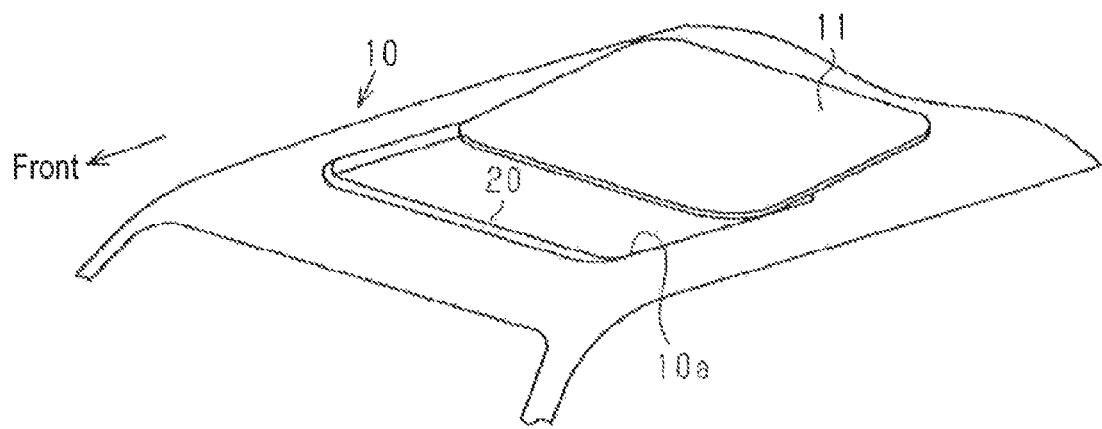
FIG. 1 is a perspective view of a roof seen from obliquely upward.

As illustrated in FIG. 1, an opening 10a including a substantially quadrilateral shape is provided at a roof 10 of a vehicle, including an automobile, on which the deflector apparatus for the vehicle is mounted. The deflector apparatus for the vehicle includes a deflector 20 extended in the vehicle width direction along a front edge portion of the opening 10a. At the roof 10, the deflector 20 is supported. Further, at the roof 10, a movable panel 11 which can open and close the opening 10a, and is formed of, for example, glass plate and is formed in a substantially quadrilateral shape is supported.

Figure 5A:
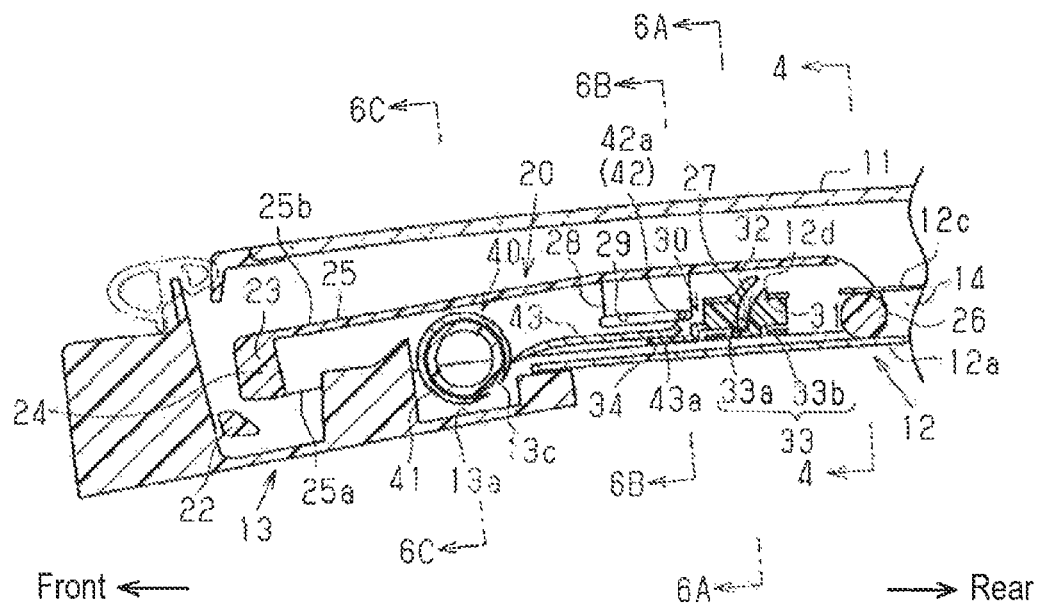
FIG. 5A is a longitudinal cross-sectional view illustrating the deflector in a retracted state.
Figure 5B:
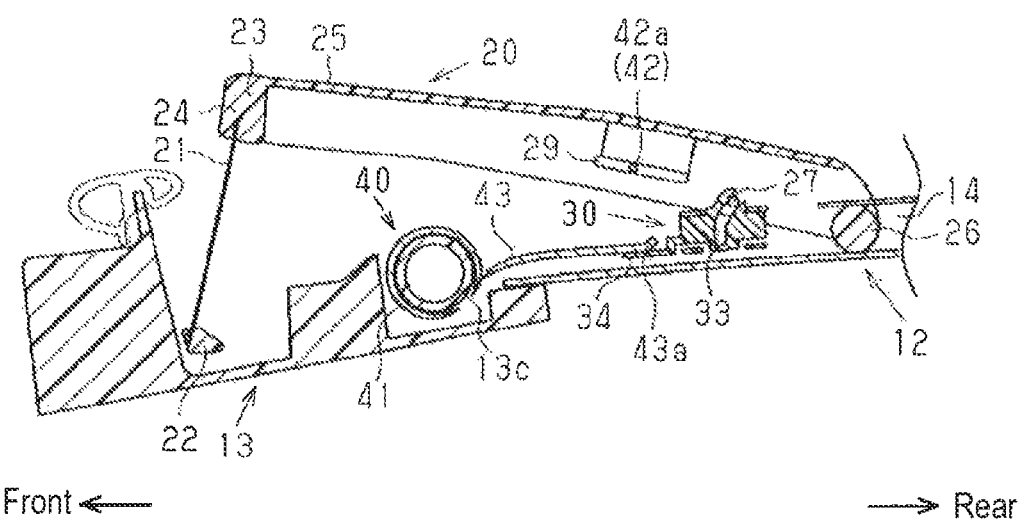
FIG. 5B is a longitudinal cross-sectional view illustrating the deflector in an expanded state.

Both end portions of the deflector 20 in the width direction are connected to the roof 10 in such a manner that the deflector 20 is rotatable around an axis line extended in the width direction. The deflector 20 is configured to perform a movement in which a front portion of the deflector 20 moves upward while the deflector 20 is rotating about a rear portion of the deflector 20 which serves as a center, that is, the deflector 20 is configured to perform a tilt-up movement. As illustrated in FIGS. 5A and 5B, in association with an opening movement of the movable panel 11, the deflector 20 is released from the movable panel 11 and performs the tilt-up movement to protrude upward relative to an upper surface of the roof 10 (an expanded state). Alternatively, in association with a closing movement of the movable panel 11, the deflector 20 is pushed and held down by the movable panel 11, and is retracted downward relative to the upper surface of the roof 10 (a retracted state). The deflector 20 is brought into the expanded state when the opening 10a is open, and accordingly the deflector 20 prevents air vibration from occurring which is attributed to entrainment of air into the vehicle cabin.

The movable panel 11 is configured to perform a tilt-up movement in which a rear portion of the movable panel 11 moves upwardly while the movable panel 11 is rotating about a front portion of the movable panel 11 which serves as a center, and to perform a slide movement in the front and rear direction. An outer-sliding type is applied to the movable panel 11, that is, at an opening and closing movement, the movable pane 11 slides and moves while being maintained in a tilt-up state in which the rear portion of the movable panel 11 is raised upwardly.

Figure 2:
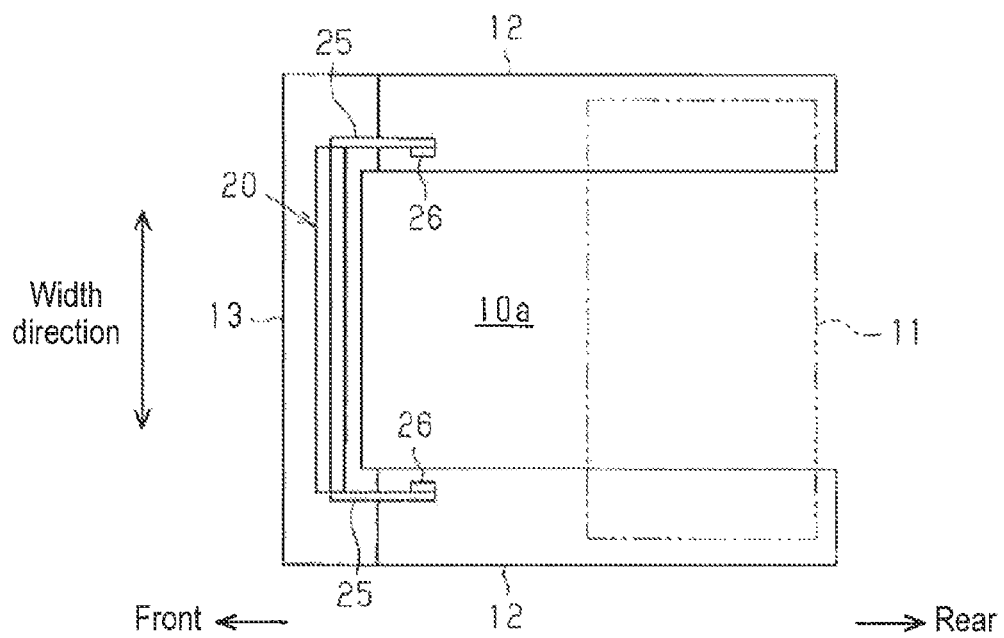
FIG. 2 is a plane view schematically illustrating an embodiment of a deflector apparatus.
Figure 3:
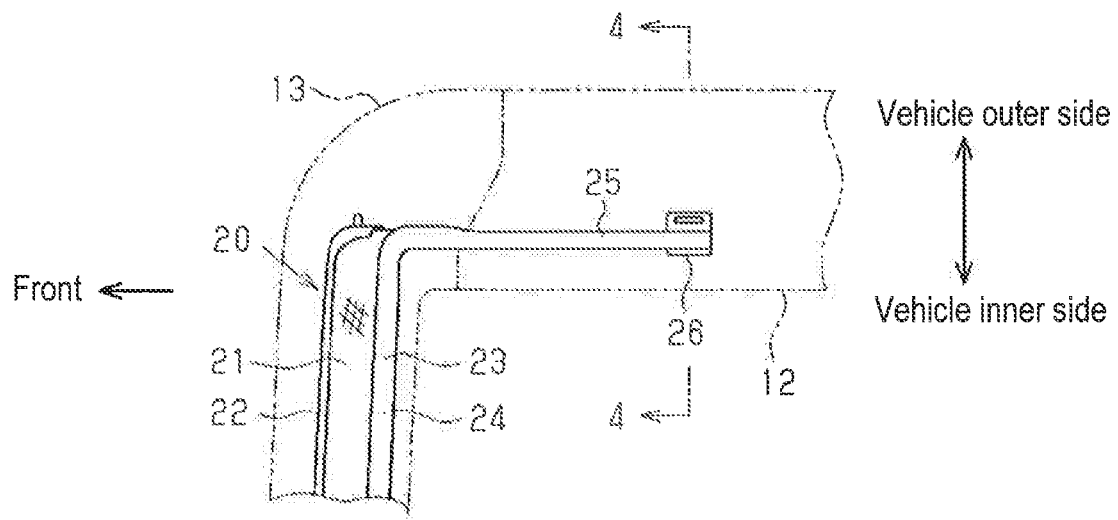
FIG. 3 is a plane view illustrating part of the deflector of FIG. 2.

As illustrated in FIGS. 2 and 3, guide rails 12 are fixedly arranged as a pair at respective edge portions, in the vehicle width direction, of the opening 10a. The pair of guide rails 12 is made of extruded material of aluminum alloy, for example. An appropriate drive mechanism (not shown), which is for driving the movable panel 11 to open and close, slides at each of the guide rails 12. In addition, the end portions of the deflector 20 in the vehicle width direction are rotatably connected to front end portions of the respective guide rails 12. The front end portions of the guide rails 12 are connected to each other by a front housing 13 extended in the vehicle width direction and made of, for example, resin material.

Next, the deflector 20 and a support structure thereof will be further described. The deflector 20 includes a mesh member 21 formed in a substantially band-shape and made of resin material, for example. The mesh member 21 is provided to extend in the width direction along the front edge portion of the opening 10a positioned at a vehicle front side relative to the guide rails 12. In addition, the deflector 20 includes a lower frame 22 formed in a substantially rod-shape and made of resin, for example. The lower frame 22 is extended in the vehicle width direction along the front housing 13 and is held at the front housing 13. The mesh member 21 includes a lower end portion and an upper end portion in a short-side direction of the mesh member 21. The lower portion is arranged at the lower frame 22 in a buried manner throughout the entire length of the mesh member 21 in a long-side direction of the mesh member 21. Further, the deflector 20 includes an upper frame 23 made of resin material, for example. The upper frame 23 integrally includes a frame portion 24 formed in a substantially rod shape and two arm portions 25. The frame potion 24 is extended in the vehicle width direction along the front edge portion of the opening 10a, and the arm portions 25 are provided to extend from respective end portions, in the vehicle width direction, of the frame portion 24 towards a vehicle rear side. An upper end portion of the mesh member 21 is arranged in a buried state at the frame portion 24 of the upper frame 23 along the entire length of the mesh member 21 in a long-side direction of the mesh member 21. A shaft portion 26, which includes a central line extending in the vehicle width direction and is formed in a substantially disc shape, is provided at a rear end portion of each of the arm portions 25 to extend from the rear end portion of the arm portion 25 towards the vehicle inner side. The arm portions 25 (the deflector 20) are rotatably connected to the respective guide rails 12 at the shaft portions 26.

Figure 4:
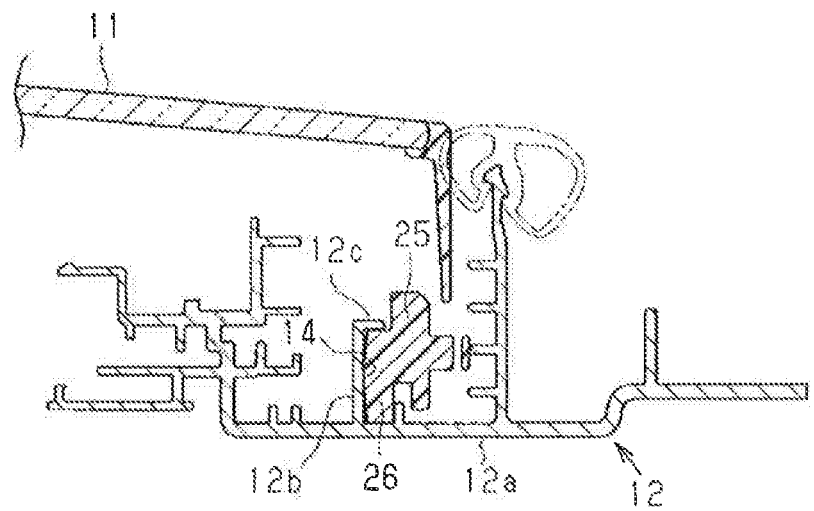
FIG. 4 is a cross-sectional view taken along line 4-4 in FIG. 3.

That is, as illustrated in FIG. 4, each of the guide rails 12 includes a bottom wall 12a including an elongated shape, an erected wall 12b, and a restriction wall 12c including a flange shape. The bottom wall 12a is extended in the front and rear direction (a direction which is orthogonal to the paper surface in FIG. 4), the erected wall 12b is provided to stand upwardly from an intermediate portion of the bottom wall 12a in the vehicle width direction, and the restriction wall 12c is extended from an upper end of the erected wall 12b towards the vehicle outer side to be substantially parallel with the bottom wall 12a. In cooperation with a part of the bottom wall 12a positioned below the restriction wall 12c, the erected wall 12b and the restriction wall 12c form a guide portion 14 (a support recessed portion) opening towards the vehicle outer side and including a substantially U-shaped cross section. As the shaft portion 26 is attached to the guide portion 14, the arm portion 25 is rotatable relative to the guide rail 12.

Accordingly, in a case where the deflector 20 changes from the retracted state illustrated in FIG. 5A to the expanded state illustrated in FIG. 5B, the upper frame 23 (the frame portion 24) rotates about the shaft portion 26 toward the upper side. Thus, the mesh member 21 of which the both end portions are fixed to the lower frame 22 and the upper frame 23 is elongated or expanded in the short-side direction thereof. As the tilt-up movement is performed, the deflector 20 is brought into the expanded state as described above. On the other hand, in a case where the deflector 20 changes from the expanded state illustrated in FIG. 5B to the retracted state illustrated in FIG. 5A, the upper frame 23 rotates about the shaft portion 26 towards the lower side. Thus, the mesh member 21 of which the both end portions are fixed to the lower frame 22 and the upper frame 23 is folded up in the short-side direction of the mesh member 21, and is brought into the retracted state. Each of the shaft protons 26 is restricted from moving in a vehicle height direction by the bottom wall 12a and the restriction wall 12c, however, is allowed to move in the front and rear direction together with the corresponding arm portion 25. The mesh member 21, the lower frame 22 and the frame portion 24 form a windbreak portion.

A cut-out 12d including a substantially quadrilateral shape is formed at the restriction wall 12c of each of the guide rails 12, at the vehicle front side relative to the shaft portion 26. A holding member 30 formed of, for example, resin material, is attached to the guide portion 14 to correspond to a position of the cut-out 12d. When the tilt-up movement of the deflector 20 is performed, the arm portions 25 engage with the respective holding members 30, and thus a posture of the deflector 20 is controlled. Accordingly, a movement of each of the shaft portions 26 in the front and rear direction along the guide portion 14 is restricted in a predetermined range.

That is, each of the holding members 30 includes a main body portion 31 formed in a substantially block shape and a protruding portion 32 formed in a substantially trapezoidal columnar shape. The main body portion 31 is attached to the guide portion 14, and the protruding portion 32 is connected to an upper end of the main body portion 31 and is fitted in the cut-out 12d by insertion. A cam groove 33 (a cam recessed portion) including an elongated groove configuration is formed between the main body portion 31 and the protruding portion 32 of the holding member 30 so as to be recessed from a vehicle outer side surface towards the vehicle inner side. The cam groove 33 includes a first groove portion 33a and a second groove portion 33b. The first groove portion 33a is extended in the vehicle height direction and a lower end of the first groove portion 33a is closed. The second groove portion 33b is connected to an upper end of the first groove portion 33a and is inclined in a vehicle rear direction towards the upper direction. An upper end of the second groove portion 33b is open.

Figure 6A:
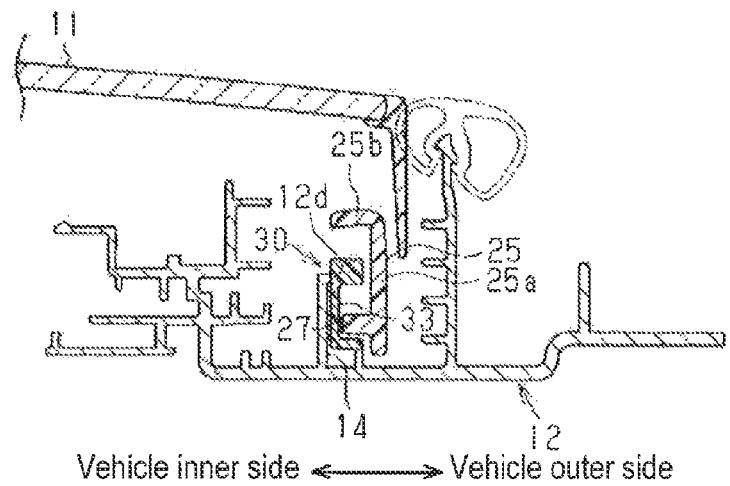
FIG. 6A is a cross-sectional view taken along line 6A-6A in FIG. 5A.

On the other hand, as illustrated in FIG. 6A, each of the arm portions 25 includes a vertical wall 25a (a first vertical wall) and an upper wall 25b formed in a flange shape. The vertical wall 25a is adjacent to the guide portion 14 to be at the vehicle outer side and is extended in the front and rear direction. The upper wall 25b is extended from an upper end of the vertical wall 25a towards the vehicle inner side to be substantially parallel with the bottom wall 12a. The vertical wall 25a is positioned at the vehicle inner side relative to an end edge of the movable panel 11 in the vehicle width direction. The vertical wall 25a is provided with a cam protruding portion 27 including a pin shape and is formed to protrude from a vehicle inner side surface of the vertical wall 25a towards the vehicle inner side. The arm portion 25 engages with the holding member 30 in a state where the cam protruding portion 27 is inserted in the cam groove 33 to be movable along the cam groove 33 and not to be movable in the front and rear direction. The holding members 30 form a support member together with the guide rails 12 and the front housing 13.

In a case where the deflector 20 changes from the state illustrated in FIG. 5A to the state illustrated in FIG. 5B, the cam protruding portion 27 is positioned at a lower end of the cam groove 33 in the retracted state of the deflector 20 (that is, a fully closed state of the movable panel 11) and moves (slides) upwardly along the cam groove 33 as the deflector 20 performs the tilt-up movement. At this time, the shaft portion 26 moves in the vehicle rear direction along the guide portion 14. This is for increasing a moving amount of the frame portion 24 in the vehicle rear direction relative to a moving amount of the frame portion 24 in the upper direction in association with the rotation of the arm portion 25 about the shaft portion 26, and thereby for inclining or tilting the mesh member 21 in the vehicle rear side more largely. Accordingly, wind received when the vehicle is running is made to flow in the vehicle rear direction more smoothly, and thus wind noise can be restricted.

Figure 6B:
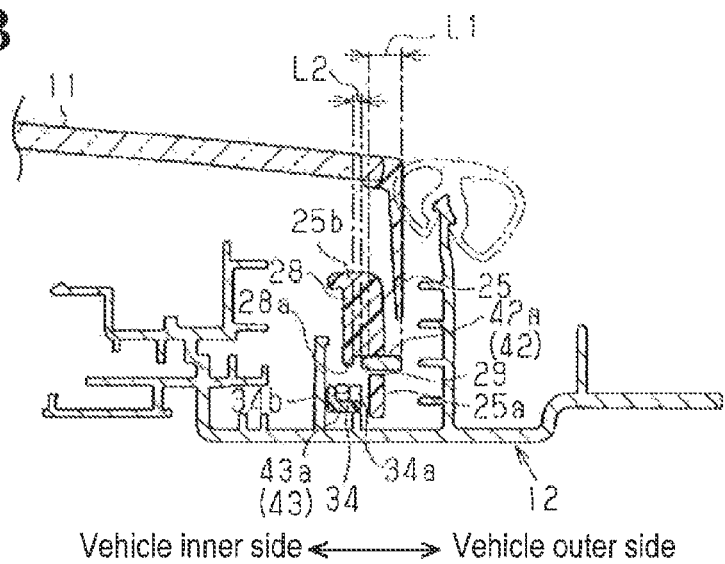
FIG. 6B is a cross sectional view taken along line 6B-6B of FIG. 5A.
Figure 7:
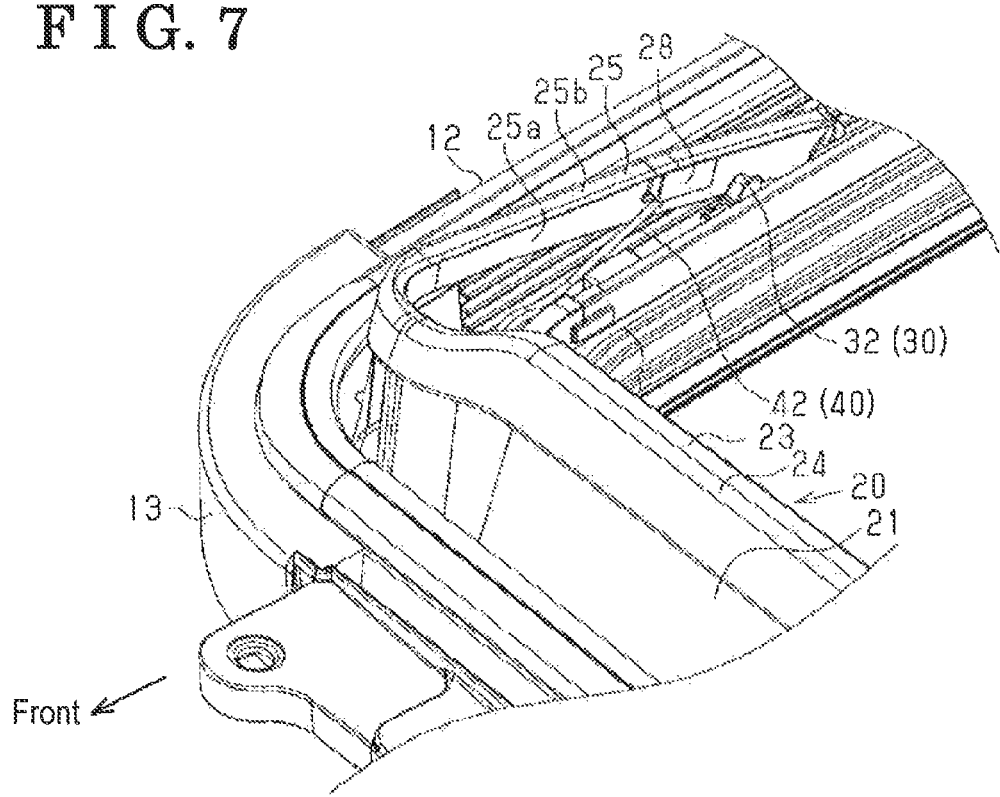
FIG. 7 is a perspective view illustrating the deflector in the expanded state.

As illustrated in FIG. 7, a pushed wall 28 including a substantially block shape is protrudingly provided at an intermediate portion, in the front and rear direction, of each of the arm portions 25, the intermediate portion which is positioned at the vehicle front side relative to the holding member 30. The pushed wall 28 is connected to a corner portion formed between the vertical wall 25a and the upper wall 25b. As illustrated in FIG. 6B, a lib 28a (a second vertical wall) protruding downwardly is provided at a vehicle inner side end of the pushed wall 28 throughout the entire length of the pushed wall 28 in the front and rear direction. In addition, as illustrated in FIG. 5A, a spring guide hole 29 including an elongated hole-shape is provided at the vertical wall 25a to be extended in the front and rear direction along a lower end of the pushed wall 28. The spring guide hole 29 includes a range of the pushed wall 28 in the front and rear direction, and is extended beyond the pushed wall 28 in the vehicle front direction slightly.

On the other hand, each of the holding members 30 includes an extended piece 34 including a substantially step configuration and is extended from a front end lower portion of the main body portion 31 towards the vehicle front side. As illustrated in FIG. 6B, an outer side restriction piece 34a including a substantially tab shape is extended upwardly from a vehicle outer side end of a front end portion of the extended piece 34, and an inner side restriction piece 34b including a substantially tab shape is extended upwardly from a vehicle inner side end that is at the vehicle rear side relative to the outer side restriction piece 34a.

Figure 6C:
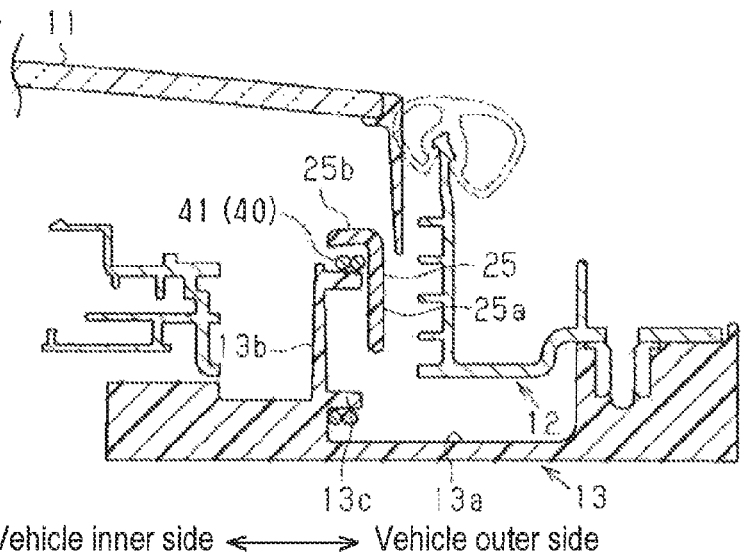
FIG. 6C is a cross sectional view taken along line 6C-6C of FIG. 5A.
Figure 8:
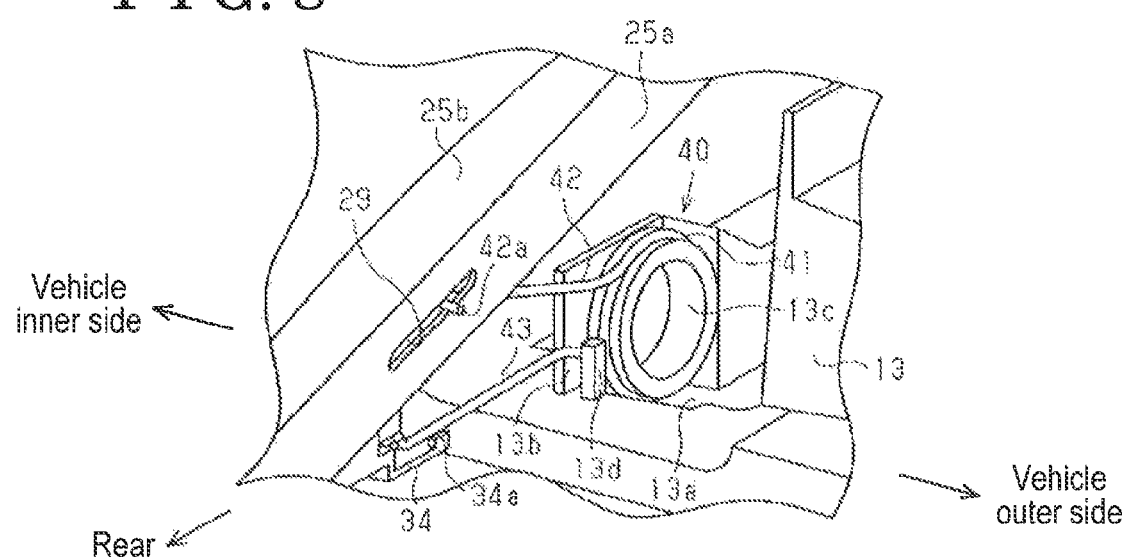
FIG. 8 is a perspective view illustrating a configuration of a coil spring and the vicinity thereof.

In addition, as illustrated in FIGS. 5A and 6C, the front housing 13 includes an accommodation recessed portion 13a provided to be recessed downwardly at the vehicle front side relative to each of the guide rails 12. A support wall 13b formed in a substantially quadrilateral plate shape is extended upwardly along an inner wall surface at the vehicle inner side of each of the accommodation recessed portion 13a. A support protruding portion 13c formed in a substantially circular cylinder shape is provided at the support wall 13b to protrude towards the vehicle outer side. The support protruding portion 13c includes a central line extending in the vehicle width direction. A coil spring 40 (a torsion spring) formed of, for example, a wire material made of metal, is supported at the support protruding portion 13c. That is, as illustrated also in FIG. 8, the coil spring 40 includes a wound portion 41 (a turning portion), a first leg portion 42 and a second leg portion 43. The first leg portion 42 and the second leg portion 43 extend in the vehicle rear direction from one end of the wound portion 41 at a vehicle outer side upper portion and from the other end of the wound portion 41 at a vehicle inner side lower portion, respectively. The coil spring 40 is supported by the support protruding portion 13c in a state where the support protruding portion 13c is loosely inserted in the wound portion 41 so that a clearance is provided between the wound portion 41 and the support protruding portion 13c.

The front housing 13 is provided with a come-off prevention protruding portion 13d including a substantially quadrangular column and arranged at the vehicle rear side relative to each of the support protruding portions 13c. The come-off prevention protruding portion 13d is formed to protrude upwardly to be substantially parallel with the support wall 13b. A base of the second leg portion 43 is sandwiched between the support wall 13b and the come-off prevention protruding portion 13d in the vehicle width direction, and thus the second leg portion 43 is restricted from moving. Accordingly, the wound portion 41 of the coil spring 40 is restricted from coming off from the support protruding portion 13c A distal end portion 42a of each first leg portion 42 is bent towards the vehicle outer side and is inserted in the spring guide hole 29 of the arm portion 25. At this time, as illustrated in FIG. 6B, the lib 28a is positioned at the vehicle inner side relative to the distal end portion 42a that is in contact with a bottom surface of the pushed wall 28. In the vehicle width direction, an insertion allowance L1 of the distal end portion 42a relative to the spring guide hole 29 is set to be larger than a distance (a separation distance) L2 between the first leg portion 42 and the lib 28a. Accordingly, a movement of the first leg portion 42 towards the vehicle inner side is restricted in a range of the distance L2, thereby reducing a possibility that the distal end portion 42a of the first leg portion 42 comes off the spring guide hole 29 (the arm portion 25). In addition, the distal end portion 43a of each second leg portion 43 is arranged on the extended piece 34 in a state where the second leg portion 43 is restricted from moving because the distal end portion 43a is interposed or sandwiched between the outer side restriction piece 34a and the inner side restriction piece 34b in the vehicle width direction. The distal end portion 42a of the coil spring 40 is in pressure contact with the spring guide hole 29 of the arm portion 25 and with the bottom surface of the pressed wall 28, and the distal end portion 43a of the coil spring 40 is in pressure contact with an upper surface of the extended piece 34 of the holding member 30. Accordingly, the deflector 20 is always biased towards a side at which a front end of the arm portion 25 moves upwardly relative to the shaft portion 26. That is, the deflector 20 is always biased in a direction in which the deflector 20 moves when the tilt-up movement is performed.

In a case where the deflector 20 changes from the state illustrated in FIG. 5A to the state illustrated in FIG. 5B, the distal end portion 42a of the first leg portion 42 is positioned at a rear end of the spring guide hole 29 in the retracted state of the deflector 20 (that is, the fully closed state of the movable panel 11), and the distal end portion 42a moves (slides) in the vehicle front direction along the spring guide hole 29 in association with the tilt-up movement of the deflector 20. In FIGS. 5A and 5B, only the distal end portion 42a of the first leg portion 42 is illustrated for convenience. Movement of the distal end portion 42a of the first leg portion 42 is guided by the spring guide hole 29, and accordingly a posture of the coil spring 40 is more stabled. Consequently, an amount of movement of the second leg portion 43 arranged on the extended piece 34, for example, is slight or none.

Next, an operation of the present embodiment will be described. The distal end portion 42a of the first leg portion 42 of the coil spring 40 and the distal end 43a of the second leg portion 43 of the coil spring 40 are free ends that can be slide-contact with the arm portion 25 and the holding member 30, respectively. Thus, when the coil spring 40 is assembled, for example, on the front housing 13 (the support member), the wound portion 41 may be attached to the support protruding portion 13c, and thus an assembling workload is restricted from increasing.

As described above in detail, the following effects are obtained according to the present embodiment. (1) According to the coil spring 40 of the present embodiment, the distal end portion 42a of the first leg portion 42 and the distal end 43a of the second leg portion 43 are the free ends that can be in slidably contact with the arm portion 25 and the holding member 30, respectively. Accordingly, increment in the workload to assemble the coil spring 40 can be restricted.

(2) In the present embodiment, the wound portion 41 of the coil spring 40 is arranged at the vehicle front side relative to the shaft portion 26, and the first leg portion 42 and the second leg portion 43 are extended from the wound portion 41 towards the vehicle rear side. Thus, the coil spring 40 is arranged to overlap the arm portion 25 in a position in the front and rear direction. Accordingly, an arrangement space of an entire deflector apparatus, which is needed in the front and rear direction, can be more reduced compared with a case where, for example, the wound portion 41 is arranged at the vehicle rear side relative to the arm portion 25. In consequence, a space portion that can be used as, for example, a space for the drive mechanism to slide, can be generated at the vehicle rear side relative to the arm portion 25, for example.

The wound portion 41 is arranged at the front side relative to the guide rail 12, at which a space portion is ensured relatively easily. Accordingly, a possibility is reduced, the possibility that the wound portion 41 is dislocated in the vehicle width direction to avoid interference with peripheral components like a case in which the wound portion 41 is arranged on the guide rail 12, for example. In consequence, the guide rail 12 can be downsized in the vehicle width direction or the space portion that can be used as, for example, the space for the drive mechanism to slide, can be generated in the vehicle width direction.

(3) In the present embodiment, the movement of the distal end portion 42a of the first leg portion 42 in association with the tilt-up movement of the deflector 20 is guided by the spring guide hole 29. Accordingly, the posture of the coil spring 40 can be more stabilized. For example, a possibility that the distal end portion 42a of the first leg portion 42 comes off the spring guide hole 29 (the arm portion 25) can be reduced.

(4) In the present embodiment, the insertion allowance L1 of the distal end portion 42a of the first leg portion 42 relative to the spring guide hole 29 is set to be larger than the distance L2 between the first leg portion 42 and the lib 28a. Accordingly, the movement of the first leg portion 42 towards the vehicle inner side (in the vehicle width direction) is restricted in the range of the distance L2. In consequence, the possibility that the distal end portion 42a of the first leg portion 42 comes off the spring guide hole 29 (the arm portion 25) can be reduced.

(5) In the present embodiment, the spring guide hole 29 is extended to include the entire range of the lib 28 (the pushed wall 28) in the front and rear direction, and is extended towards the vehicle front side slightly beyond the pushed wall 28. In association with the tilt-up movement of the deflector 20, the distal end portion 42a of the first leg portion 42 moves within the range in which the lib 28a is extended. That is, the lib 28a is provided at a portion of the spring guide hole 29, which is a portion including an entire moving range of the distal end portion 42a at a time of the tilt-up movement of the deflector 20. Therefore, the distal end portion 42a of the first leg portion 42 can be inserted in the spring guide hole 29 without being inhibited by the lib 28a as long as the distal end portion 42a is inserted in the other portion of the spring guide hole 29 than the portion including the entire moving range of the distal end portion 42a (that is, the portion of the spring guide hole 29 at the vehicle front side relative to the lib 28a). In consequence, an assembling performance can be enhanced more.

(6) In the present embodiment, the material of the coil spring 40 is metal wire. Accordingly, the vehicle can be downsized more in the width direction compared to a case where, for example, the material of the coil spring 40 is metal plate. Thus, space portions on the vehicle in the width direction, the space portions required for arranging the respective arm portions 25, can be reduced more. In consequence, an opening width of the opening 10a in the vehicle width direction can be increased more.

(7) In the present embodiment, the second leg portion 43 of the coil spring 40 is in contact with the holding member 30 (the extended piece 34) made of resin. Accordingly, for example, abnormal sound caused by metals which are in contact with each other can be restricted from occurring.

(8) In the present embodiment, when the tilt-up movement of the deflector 20 is performed, the posture of the deflector 20 is controlled by the cam groove 33 of the holding member 30 into which the cam protruding portion 27 of the arm portion 25 is inserted. Accordingly, by changing the shape and configuration of the cam groove 33, an accommodation space for the deflector 20 that is in the retracted state can be adjusted easily and/or an inclination angle of the mesh member 21 of the deflector 20 that is in the expanded state can be adjusted easily, for example. By reducing the accommodation space for the deflector 20 that is in the retracted state, an opening width of the opening 10a in the front and rear direction can be increased more, for example.

(9) In the present embodiment, the shaft portion 26 (the arm portion 25) is moved in the vehicle rear direction in association with the tilt-up movement of the deflector 20. Accordingly the mesh member 21 can be made inclined more largely in the vehicle rear direction without specially increasing an extension length of the arm portion 25 towards the vehicle rear side, that is, a dimension of the arm portion 25 in the front and rear direction, for example.

Figure 9:
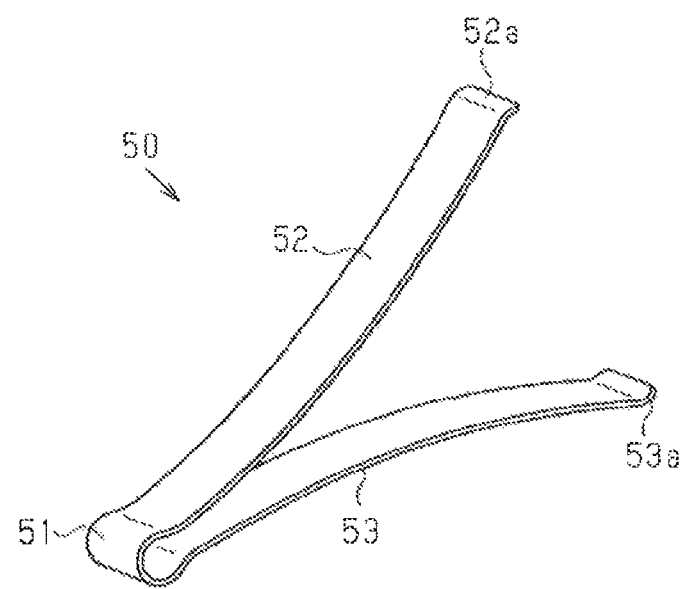
FIG. 9 is a perspective view illustrating a torsion spring of a deflector apparatus in a variation.

The aforementioned embodiment may be modified as follows. As illustrated in FIG. 9, the deflector 20 may include a torsion spring 50 made of metal plate. Each torsion spring 50 includes a turning portion 51 including a substantially major arc cylindrical shape, a first leg portion 52 and a second leg portion 53. The first leg portion 52 and the second leg portion 53 extend in the vehicle rear direction from one end of the upper portion of the turning portion 51 and from the other end of the upper portion of the turning portion 51, respectively. The torsion spring 50 is supported by the support protruding portion 13c in a state where the support protruding portion 13c is loosely inserted in the turning portion 51 so that a clearance is made between the turning portion 51 and the support protruding portion 13c. A distal end portion 52a of the first leg portion 52 of the torsion spring 50 is arranged at a bottom surface of the arm portion 25 (for example, a bottom surface of the upper wall 25b) in a manner that the distal end portion 52a can be in slide contact with the bottom surface of the arm portion 25 and a distal end portion 53a of the second leg portion 53 of the torsion spring 50 is arranged at an upper surface of the extended piece 34 in a manner that the distal end portion 53a can be in slide contact with the upper surface of the extended piece 34. The distal end portions 52a and 53a of the torsion spring 50 are in pressure contact with the arm portion 25 and the holding member 30, respectively. Accordingly, the deflector 20 is always biased towards the side at which the front end of the arm portion 25 moves upwardly relative to the shaft portion 26, while the first and second leg portions 52 and 53 are being opened. That is, the deflector 20 is always biased in the direction in which the deflector 20 moves when the tilt-up movement is performed.

Also in the modified embodiment, the effects similar to the effects of the aforementioned embodiments which are described in the above (1), (2), (7) to (9) can be obtained. Instead of the turning portion 51 including the substantially major arc cylindrical shape, a wound portion at which metal plate is wound in a spiral configuration, that is, a wound portion including a spiral shape, may be used.

In the aforementioned embodiment, a turning portion including a substantially major arc cylindrical shape may be used instead of the wound portion 41. In the aforementioned embodiment, a range of the spring guide hole in the front and rear direction may match the moving range of the distal end portion 42a of the first leg portion 42 in association with the tilt-up movement of the deflector 20, that is, the range of the lib 28a (the pushed wall 28) in the front and rear direction.

In the aforementioned embodiment, the insertion allowance L1 of the distal end portion 42a of the first leg portion 42 relative to the spring guide hole 29 may be set to be equal to the distance L2 between the first leg portion 42 and the lib 28a or to be smaller than the distance L2.

In the aforementioned embodiment, the pushed wall 28 may be omitted and the second vertical wall which is according to or is similar to the lib 28a may be formed at the upper wall 25b. Alternatively, the lib 28a and/or the pushed wall 28 may be omitted. In the aforementioned embodiment, the spring guide hole 29 of the arm portion 25 may be omitted and the distal end portion 42a of the first leg portion 42 may be in slide contact with the bottom surface of the arm portion 25 (for example, the bottom surface of the upper wall 25b).

In the aforementioned embodiment, the wound portion 41 of the coil spring 40 may be supported at the support protruding portion provided at the guide rail 12. The first and second leg portions 42 and 43 of the coil spring 40 may extend in the vehicle front direction from the wound portion 41. In this case, the wound portion 41 may be arranged at the vehicle rear side relative to the shaft portion 26.

In the aforementioned embodiment, the shaft portion 26 may be formed to protrude towards the vehicle outer side. In this case, the support recessed portion may be provided at the guide rail 12 (the support member) in such a manner that the shaft portion 26 is inserted in the support recessed portion to be rotatable, and to be movable in the vehicle front and rear direction.

In the aforementioned embodiment, the cam protruding portion 27 may be formed to protrude towards the vehicle outer side. In this case, the cam recessed portion may be formed in such a manner that the cam protruding portion 27 is movably inserted in the holding member 30 (the support member).

In the aforementioned embodiment, the support protruding portion 13c may be formed to protrude towards the vehicle inner side. In the aforementioned embodiment, the support protruding portion 13c may include a substantially circular-columnar shape, a polygonal columnar shape or a polygonal cylindrical shape as long as the support protruding portion 13c is loosely insertable in the wound portion 41 so that the clearance is made between the wound portion 41 and the support protruding portion 13c. The support protruding portion which is made separately from the housing 13 may be used and the support protruding portion may be fixed to the front housing 13.

In the aforementioned embodiment, a wire diameter of the metal wire serving as the material of the coil spring 40, the number of turns of the wound portion 41 and a diameter of the wound portion 41 may be arbitrarily set. It is more ideal that these elements are minimized in a range in which a required biasing force is obtained.

In the aforementioned embodiment, for example, the wound portion 41 may be configured to rotate about the support protruding portion 13c at the time of the tilt-up movement of the deflector 20 or the wound portion 41 may be configured not to rotate at the time of the tilt-up movement of the deflector 20.

In the aforementioned embodiment, any two or more of the guide rail 12, the front housing 13 and the holding member 30 may be formed to be integral with each other. For example, the holding member 30 may be formed to be integral with the guide rail 12 by, for example, by outsert molding. The holding member 30 (for example, the cam groove 33) may be integrally formed at the guide rail 12 (for example, the guide portion 14) made of resin. The front housing 13 (for example, the support protruding portion 13c) may be integrally formed at the guide rail 12 made of resin.

In the aforementioned embodiment, the deflector may perform the tilt-up movement while moving in the vehicle front direction. In the aforementioned embodiment, instead of the deflector 20 of which the mesh member 21 is expanded and folded between the lower frame 22 and the upper frame 23 (the frame portion 24), the windbreak portion which is connected by a panel made of resin to include an elongated shape may be provided between the lower frame 22 and the upper frame 23, for example. That is, at the front edge portion of the opening 10a, the windbreak portion may move upwardly and downwardly without changing a shape of the windbreak portion itself.

The invention claimed is:

1. A deflector apparatus for a vehicle, comprising:
a deflector including a windbreak portion arranged along a front edge portion of an opening provided at a roof of a vehicle, the deflector including arm portions provided as a pair to extend from both end portions, in a vehicle width direction, of the windbreak portion towards a vehicle rear side, each of the arm portions including a shaft portion provided to extend in the vehicle width direction and a cam protruding portion provided to extend in the vehicle width direction;
a support member fixed to the roof, the support member including a support recessed portion in which the shaft portion is inserted to be rotatable and to be movable in a vehicle front and rear direction, and a cam recessed portion in which the cam protruding portion is inserted to be movable, the support member including a support protruding portion extended in the vehicle width direction, the support recessed portion guiding movement of the shaft portion and the cam recessed portion guiding movement of the cam protruding portion such that a tilt-up movement of the deflector is performed in association with rotation of the deflector about the shaft portion; and
a torsion spring including a turning portion attached to the support protruding portion, the torsion spring including a first leg portion and a second leg portion each extended in the vehicle front and rear direction from the turning portion, the first leg portion including a distal end portion which can be in slide contact with the arm portion, the second leg portion including a distal end portion which can be in slide contact with the support member, the torsion spring biasing the arm portion such that the tilt-up movement of the deflector is performed in association with an opening movement of a movable panel opening and closing the opening.

2. The deflector apparatus for the vehicle according to claim 1, wherein
the turning portion is arranged at a vehicle front side relative to the shaft portion, and
the first leg portion and the second leg portion are extended from the turning portion towards the vehicle rear side.

3. The deflector apparatus for the vehicle according to claim 1, wherein
the arm portions each include a spring guide hole in which the distal end portion of the first leg portion is inserted, and
the spring guide hole guides movement of the distal end portion of the first leg portion, the movement of the distal end portion being in association with the tilt-up movement of the deflector.

4. The deflector apparatus for the vehicle according to claim 3, wherein
the arm portions each include a first vertical wall including the spring guide hole, and a second vertical wall arranged side by side with the first vertical wall such that the first leg portion is interposed between the first vertical wall and the second vertical wall in the vehicle width direction, and
in the vehicle width direction, an insertion allowance of the distal end portion of the first leg portion relative to the spring guide hole is larger than a distance between the first leg portion and the second vertical wall.

5. The deflector apparatus for the vehicle according to claim 4, wherein
the spring guide hole includes a portion including an entire moving range of the distal end portion of the first leg portion at a time of the tilt-up movement of the deflector.

* * * * *